Patented Mar. 7, 1950

2,499,373

UNITED STATES PATENT OFFICE 2,499,373

MANUFACTURE OF MELAMINE AND CONDENSATION PRODUCTS THEREOF

Colver P. Dyer, Winchester, Mass., assignor to Monsanto Chemical Company, St. Louis, Mo., a corporation of Delaware No Drawing. Application June 5, 1946,
Serial No. 674,632

4 Claims. (Cl. 260—249.5)

The present invention relates to the manufacture of melamine and resinous products prepared therefrom. More particularly, the present invention relates to the manufacture of melamine having improved color properties so that aldehyde-melamine resinous products prepared therefrom possess improved color characteristics.

It is well known to manufacture melamine by heating dicyandiamide and liquid ammonia at elevated temperatures. Thus, Franklin, "Journal of the American Chemical Society," volume 44, page 504, 1922, describes such a process. Many modifications of this process have been attempted. Thus, U. S. Patent 2,170,491 to Gustave Widmer and Willi Fisch describes a process wherein dicyandiamide and ammonia are heated under varying and carefully controlled temperatures and pressure conditions.

However, when melamine is prepared by heating commercial dicyandiamide and ammonia under positive pressure, even under carefully controlled conditions, although good yields of relatively pure melamine may be obtained, on reacting with formaldehyde to produce condensation or reaction products, the condensation or reaction products obtained are found to be markedly discolored. This discoloration of the resins is so great as to limit and, in some cases, prohibit their use.

An object of the present invention is to provide a process for the preparation of melamine.

Another object is to provide melamine from which aldehyde condensation products having improved color are obtained.

Another object is to provide melamine-formaldehyde condensation products having improved color characteristics.

These and other objects will be apparent as hereinafter described.

In accordance with this invention, it has been found that on the incorporating of relatively small proportions of a neutral ammonium salt of an inorganic acid to the dicyandiamide prior to its conversion by heating to melamine, a marked improvement in the melamine so formed is obtained, which is in particular noted by the improvement in the color of the formaldehyde-melamine resinous products prepared therefrom.

By the term "neutral ammonium salt of an inorganic acid" as disclosed and claimed herein, is meant an ammonium salt of an inorganic acid, which salt, under the conditions of the heating of dicyandiamide under pressure to form melamine, is non-oxidizing, non-reducing, and is not itself color producing. Illustrative of this class of compounds are the ammonium halides and ammonium borate.

Example I 100 parts by weight of commercial dicyandiamide and 80 parts by weight of liquid anhydrous ammonia together with .8 part by weight of commercial ammonium borate were placed in a suitable autoclave and heated gradually over a period of about 1 hour to a temperature of about 120-130° C. and a positive pressure of about 450-500 pounds per square inch, at the end of which time the temperature and pressure rose rapidly to a temperature of about 350° C. and a pressure of about 1000 pounds per square inch respectively, where they remained for a short time. The reaction vessel and contents were allowed to cool, the pressure released and the melamine removed from the reactor. The melamine so obtained was markedly lighter in color than melamine obtained in the same manner, except that ammonium borate was not incorporated with dicyandiamide prior to the conversion step.

Example II

In order to show its improvement in discoloration when converted into melamine-formaldehyde resins, 126 grams of the melamine obtained as in Example I (1 molecular proportion) was reacted with 203 grams of aqueous 37% formaldehyde solution (2.5 molecular proportions) by heating at a temperature of substantially 95° C. in the presence of an amount of an aqueous sodium hydroxide catalyst sufficient to make the solution alkaline to phenolphthalein, for a sufficient period of time to produce a hydrophobe resin, for example, 1 hour. To the liquid resin so obtained there was added 50 ccs. of ethyl alcohol and any insoluble material removed by filtration. It was found that the insoluble material was practically negligible. Portions of this solution so obtained were then tested for color in accordance with the procedure set forth in "Standard Methods of Water Analysis," published by the American Public Health Association, New York, New York, 1936 edition, pages 12-14, and had a color index of 45.

Melamine prepared from dicyandiamide and ammonia in a manner similar to that given in Example I, excepting that no other ingredients were added thereto prior to the conversion to melamine, was reacted with formaldehyde and the reaction product tested for color, both as indicated under Example II above and the resin found to possess a color index of 85.

Example III 100 parts by weight of commercial dicyandiamide and 80 parts by weight of anhydrous liquid ammonia together with 1 part by weight of ammonium chloride were placed in an autoclave and heated under pressure in a similar manner to that given in Example I. The melamine so obtained was then reacted with formaldehyde and the melamine-formaldehyde condensation product tested for color, both as given in Example II. The resin was found to have a color index of 45.

*Example IV*

In this example, 100 parts by weight of commercial dicyandiamide, 80 parts by weight of anhydrous liquid ammonia and 0.5 part by weight of ammonium fluoride were placed in an autoclave and heated under pressure in a similar manner to that given in Example I. The melamine so obtained was then reacted with formaldehyde and the melamine-formaldehyde condensation product tested for color, both as given in Example II. The resin was found to have a color index of 55.

By the process of this invention as above described, yields of about 95% high quality melamine, based on the dicyandiamide, are obtained.

It is thus apparent that by the present invention a marked advance has been made in the art of manufacturing melamine from dicyandiamide with an accompanying improvement in the aldehyde-melamine resins obtained therefrom. If preferred, the quantities of the ammonium salts of the present invention employed may be varied and the process and products found to still exhibit the desired color inhibiting properties characteristic of the invention. It is generally preferred, however, in order to obtain the best results, that quantities of the ammonium salts of this invention varying between about 0.2% and about 2.0% of the weight of the dicyandiamide charged be employed.

It will be noted that the melamine-formaldehyde resins herein have been variously referred to as reaction products or condensation products. These terms are used interchangeably in accordance with the practice in this art.

It is, of course, understood, as will be readily apparent to those skilled in the art to which this invention pertains, that the neutral ammonium salts of inorganic acids of this invention may be added to other proportions of dicyandiamide and ammonia than those specifically shown, and the materials heated under positive pressure to produce an improved melamine. Further, it is to be understood that the melamine so obtained may be reacted with varying amounts of formaldehyde and catalyst to produce melamine-formaldehyde condensation products having improved color characteristics. The examples disclosed herein are to be understood as illustrative and in nowise limitative of the scope of the invention.

What is claimed is:

1. A method of manufacturing melamine comprising mixing dicyandiamide and ammonia and heating the mixture under positive pressure in the presence of from about 0.2 to 2%, based on the weight of the dicyandiamide, of an ammonium halide.

2. A method of manufacturing melamine comprising mixing dicyandiamide and ammonia and heating the mixture under positive pressure in the presence of from about 0.2% to about 2.0%, based on the weight of the dicyandiamide, of a neutral ammonium salt of an inorganic acid.

3. A method of manufacturing melamine comprising mixing dicyandiamide and ammonia and heating the mixture under positive pressure in the presence of from about 0.2% to about 2.0%, based on the weight of the dicyandiamide, of ammonium chloride.

4. A method of manufacturing melamine comprising mixing dicyandiamide and ammonia and heating the mixture under positive pressure in the presence of from about 0.2% to about 2.0%, based on the weight of the dicyandiamide, of ammonium borate.

COLVER P. DYER.

REFERENCES CITED

The following references are of record in the file of this patent:

UNITED STATES PATENTS

| Number | Name | Date |
|---|---|---|
| 2,164,705 | Fisch | July 4, 1939 |
| 2,211,709 | Zerweck | Aug. 13, 1940 |
| 2,262,935 | Hill | Nov. 18, 1941 |
| 2,288,964 | Widmer | July 7, 1942 |
| 2,371,480 | Swain | Mar. 13, 1945 |
| 2,396,193 | Paden | Mar. 5, 1946 |

OTHER REFERENCES

Lowry and Harrow: "Introduction to Organic Chemistry," John Wiley and Son, 2nd edition, 1928, p. 1.